(12) United States Patent
Sullivan

(10) Patent No.: US 10,611,468 B2
(45) Date of Patent: Apr. 7, 2020

(54) METHOD AND APPARATUS FOR MITIGATING TRAILING VORTEX WAKES OF LIFTING OR THRUST GENERATING BODIES

(76) Inventor: Steven Sullivan, Ashburn, VA (US)

(*) Notice: Subject to any disclaimer, the term of this patent is extended or adjusted under 35 U.S.C. 154(b) by 2148 days.

(21) Appl. No.: 11/852,753

(22) Filed: Sep. 10, 2007

(65) Prior Publication Data

US 2008/0061192 A1    Mar. 13, 2008

Related U.S. Application Data

(60) Provisional application No. 60/842,987, filed on Sep. 8, 2006.

(51) Int. Cl.
*B64C 23/00* (2006.01)
*B64C 21/10* (2006.01)

(52) U.S. Cl.
CPC ........... *B64C 23/005* (2013.01); *B64C 21/10* (2013.01); *B64C 2230/12* (2013.01); *B64C 2230/26* (2013.01); *F05D 2270/172* (2013.01); *Y02T 50/166* (2013.01)

(58) Field of Classification Search
CPC ... B64C 23/005; B64C 21/10; B64C 2230/12; B64C 2230/26; F05D 2270/172; Y02T 50/166
See application file for complete search history.

(56) References Cited

U.S. PATENT DOCUMENTS

| | | | | | |
|---|---|---|---|---|---|
| 4,802,642 | A | * | 2/1989 | Mangiarotty | 244/200 |
| 4,830,315 | A | * | 5/1989 | Presz et al. | 244/200 |
| 4,932,612 | A | * | 6/1990 | Blackwelder et al. | 244/207 |
| 5,088,665 | A | * | 2/1992 | Vijgen et al. | 244/200 |
| 5,114,099 | A | * | 5/1992 | Gao | 244/130 |
| 5,542,630 | A | * | 8/1996 | Savill | 244/200 |
| 5,860,626 | A | * | 1/1999 | Moser | 244/200 |
| 5,884,871 | A | * | 3/1999 | Fedorov et al. | 244/200 |
| 5,901,925 | A | * | 5/1999 | McGrath et al. | 244/45 A |
| 6,131,853 | A | * | 10/2000 | Bauer et al. | 244/113 |
| 6,431,498 | B1 | * | 8/2002 | Watts et al. | 244/198 |
| 6,733,240 | B2 | * | 5/2004 | Gliebe | 416/228 |
| 6,837,465 | B2 | * | 1/2005 | Lisy et al. | 244/204.1 |
| 7,070,144 | B1 | * | 7/2006 | DiCocco et al. | 244/3.21 |
| 2006/0101807 | A1 | * | 5/2006 | Wood et al. | 60/262 |

* cited by examiner

*Primary Examiner* — Assres H Woldemaryam
(74) *Attorney, Agent, or Firm* — Fresh IP PLC; Aubrey Y Chen

(57) ABSTRACT

This patent provides for a method and apparatus for mitigating the formation of concentrated wake vortex structures generated from lifting or thrust-generating bodies and maneuvering control surfaces wherein the use of contour surface geometries promotes vortex-mixing of high and low flow fluids. The method and apparatus can be combined with various drag reduction techniques, such as the use of riblets of various types and/or compliant surfaces (passive and active). Such combinations form unique structures for various fluid dynamic control applications to suppress transiently growing forms of boundary layer disturbances in a manner that significantly improves performance and has improved control dynamics.

51 Claims, 6 Drawing Sheets

Riblets of Various Cross-Sectional Geometry

Riblets of Various Cross-Sectional Geometry

Compound Riblet Geometry

Sharkskin

Owl's feather

Riblet and/or Contour Surface Geometry though the above approaches do not eliminate the
METHOD AND APPARATUS FOR MITIGATING TRAILING VORTEX WAKES OF LIFTING OR THRUST GENERATING BODIES This application claims the benefit of U.S. Provisional Patent Application No. 60/842,987 filed Sep. 8, 2006, the entire disclosure of which is incorporated herein by reference.

BACKGROUND OF THE INVENTION

Field of the Invention

The invention relates to the field of fluid dynamics, and particularly to the fluid flow relative to a surface such as a lifting and/or thrust-generating body.

Related Art

Various methods of wake vortex control and drag alleviation have been proposed in the prior art. These include control surface oscillations, wingtip devices, multi-wake interactions, thermal forcing and mass/momentum injection. Various methods which promote mixing using corrugated, serrated or convoluted surfaces or control surfaces have been proposed for reducing drag. See, e.g., Sinous Chevron Exhaust Nozzle, U.S. Patent Publication US 2005/0172611; Method and Device for Reducing Engine Noise, U.S. Pat. No. 7,240,493 B2; System and Method of Vortex Wake Control using Vortex Leveraging, U.S. Pat. No. 6,042,059; Undulated nozzle for enhanced exit area mixing, U.S. Pat. No. 6,082,635; Airfoil trailing edge, U.S. Pat. No. 4,813,633; Two-stage mixer ejector suppressor, U.S. Pat. No. 5,761,900; Diffuser with convoluted vortex generator, U.S. Pat. No. 4,971,768; Serrated fan blade, U.S. Pat. No. 6,733,240; Wind turbine, U.S. Pat. No. 5,533,865; Spiral-based axial flow devices, U.S. Pat. No. 6,336,771; Multi-stage mixer/ejector for suppressing infrared radiation, U.S. Pat. No. 6,016,651; Serrated-planform lifting-surfaces U.S. Pat. No. 5,901,925; Serrated leech flaps for sails, U.S. Pat. No. 6,684,802; Serrated trailing edges for improving lift and drag characteristics of lifting surfaces, U.S. Pat. No. 5,088,665; Helicopter rotor with blade trailing edge tabs responsive to control system loading, U.S. Pat. No. 4,461,611; Jet Exhaust Noise Reduction system and Method, U.S. Pat. No. 7,114,323 B2; Quiet Chevron/Tab Exhaust Eductor System, U.S. Patent Publication US2006/0059891 A1.

It is known in the field of fluid dynamics, in particular within aeronautics, to apply the concept of wake vortex mitigation to reduce the influence of trailing vortex wakes of a lifting or thrust-generating body or wing by the addition of winglet structures at the wingtips thus reducing the induced drag due to the kinetic energy of such concentrated wake vortex structures generated by the lifting or thrust-generating surface as a whole.

Various methods of wake vortex control and drag alleviation have been proposed and are referenced within and the entire teachings of which and their references sited therein are expressly incorporated by reference herein. These include control surface oscillations, wingtip devices, multi-wake interactions, thermal forcing and mass/momentum injection.

The prior art includes several devices and methods that attempt to overcome the problem of concentrated vortex wakes. Several types of improvements have been proposed in an attempt to reduce the kinetic energy of vortex wakes. These include: Vortex Dissipator, U.S. Pat. No. 3,845,918; Vortex Diffusion and Dissipation, U.S. Pat. No. 4,046,336; Vortex Diffuser, U.S. Pat. No. 4,190,219; Vortex Alleviating Wing Tip, U.S. Pat. No. 4,447,042; Wingtip Airfoils, U.S. Pat. No. 4,595,160.

However, the above approaches do not eliminate the concentrated wake vortex generated at the wingtip. The "spiroid" wing tip of U.S. Pat. No. 5,102,068, Apr. 7, 1992, produces a reduction in induced drag, much like that of a winglet. Although a closed lifting or thrust-generating system may eliminate the wing tips, it does not eliminate the concentrated trailing wake vortex structure.

In order to significantly reduce the concentration of the trailing wake vortex structure and the associated kinetic energy there must be a change in the wing structure that promotes mixing of the upper fluid stream and lower fluid stream such that the fluid mixing or vortex-mixing is not forced to occur at the wing tip region as within the current state of the art. One example is that described within Lifting or thrust-generating Body with Reduced-Strength Trailing Vortices, U.S. Pat. No. 5,492,289 which produces a reduction in drag but does not eliminate the concentrated trailing wake vortex structure wherein vortex-mixing is forced to occur at the wing tip or control surface tip and is not distributed along the length of the wing span or control surfaces thereof.

Riblets are well known within the art for reducing drag. See, e.g., Steamwise Variable Height Riblets For Reduced Skin Friction Drag Of Surfaces, U.S. Pat. No. 6,345,791.

Compliant surfaces are also well known within the art for reducing drag. See, e.g., Shape Changing Structure, U.S. Pat. No. 7,216,831 B2; Morphing Structure, U.S. Patent Publication US2006/101807.

The above-discussed active and passive methods, although they do reduce induced drag for improvement in performance, provide no substantial decrease in rolling moment coefficients that generate wake vortexes. Thus there is a lack in the art for a truly effective and reliable method of trailing wake vortex mitigation.

OBJECTS OF THE INVENTION

Accordingly, it is an object of the invention to provide an improved system and method for control of trailing wake vortex structures called "vortex-mixing" that include; design of riblets and/or compliant surfaces combined with lifting or thrust-generating body trailing edge shapes that vary across the trailing edge for deflectable and/or non-deflectable surfaces that produce smaller wake vortex perturbations along the entire lifting or thrust-generating body span structure. These contour shaped lifting or thrust-generating bodies combined with various combinations of riblet and/or compound riblet and/or shaped riblets and/or compliant surfaces, promote chord wise fluid flow and exploit the mixing of the lower fluid stream and upper fluid stream of the lifting or thrust-generating surface or other surfaces such that the time and position of the fluid stream mixing is varied across the span of lifting or thrust-generating body trailing edge thus reducing the size and duration of the trailing wake vortex structures generated from said lifting or thrust generating body thus allowing for high-force, high-deflection capabilities of deflectable surfaces which have proved to be well suited for the requirements of mitigating the concentrated trailing wake vortex structures generated by lifting or thrust-generating bodies at the lifting or thrust generating body within the root and tip region.

Further, it is an object of the invention to provide an improved system and method for decreased drag on static structures that include; design of shapes that vary across the three dimensions of the static body that produce smaller wake perturbations. These contour shaped bodies, exploit the structures used in the lifting or thrust-generating surface such that the time and position of the fluid stream mixing is varied across the static bodies trailing edge thus reducing the size and energy of the wake generated from said static bodies thus allowing for a reduced drag, which have proved to be well suited for the requirements of static structures such as oil rigs, pipe structures, bridges and, buildings.

Further, various methods that promote mixing using corrugated, serrated or convoluted surfaces or control surfaces can be combined with contour surface geometries to form new advanced surfaces that promotes the vortex-mixing system and method.

It is a further object of the invention to overcome the inherent limitations in implementation and drawbacks associated with prior art systems for control of aircraft induced drag or vortex drag due to the formation of noise associated with concentrated trailing wake vortex structures.

A further object of the invention is to reduce drag of the components involved in, manoeuvring, and control systems, adding stability to the vehicle's structure, and increasing reliability.

Another objective is to reduce the rate of wear and cyclic stress associated with a vehicle's actuation surfaces and/or lifting or thrust-generating body structure due to oscillating forces known as "flutter" which affects control surfaces and lifting or thrust-generating body structure wherein such control surface and lifting or thrust-generating body structure flutter is significantly reduced within the invention, which affects control surface and lifting or thrust generating body performance thus affecting noise and safety.

A further object is to provide a means of improved mixing within jet engine and blade structures of an aircraft jet engine wherein improved mixing flow is accomplished for improved fuel burn thus improving the propulsion or motive force applied by the jet engines which contributes to increased, fuel efficiency, stability, maneuverability, and safety of aircraft.

A further object is to provide a means of noise reduction by means of improved vortex-mixing within the jet engine and turbine blade structures of an aircraft thus assisting in noise control wherein there is reduced aerodynamic noise and more efficient mixing within the jet engine.

A further object is to provide a means of structural shell or volume or connected or related appendages of said structural shells or volumes of a defined surface or surfaces that are unrestricted as to scale, shape, thickness, combined with rigid and/or compliant material, of the given structural shell or volume of one or more possible parametric dimensions wherein said dimensions may correspond to mesh curves as in FIG. 6, optionally spiralizing the mesh curves wherever desired to make more efficient the provision needed for the local density of mesh curves in way of potentially shape-ambiguous inflections within intervals, optionally contouring in width and thickness, to accommodate the local curvature of the design surface at each intersection adjacent to said interval, and finally to accommodate the relation of said local curvature to the particular over-under topology of a mesh at each intersection precisely, the designed shape, size, interstitial spaces and structural properties applied to source design shells and volumes.

SUMMARY OF THE INVENTION

The present invention provides a method of mitigating concentrated wake vortex effects on the performance of lifting or thrust-generating bodies and maneuvering control surfaces for various fluid dynamic applications. There are many economic and safety benefits of incorporating the vortex-mixing method wherein the patent will deliver reduced drag, improved control surface performance for optimum control capability of lifting or thrust-generating surfaces thus more effective levels of motion control and reduced stress are now possible with the added benefit of reduced noise levels and may be combined with drag reduction methods which as an aggregate structure reduces vortex induced drag from and attenuates wake vortex kinetic energy.

A contour surface is integrated into the trailing edge of lifting or thrust-generating bodies for the purpose of generating many and much smaller low intensity wake vortex structures aft of the trailing edge of lifting or thrust-generating bodies. As a result the contoured surfaces facilitates both increased thrust and decreased induced drag.

Mitigating trailing vortex wakes of lifting or thrust-generating bodies within aeronautic applications would allow for a reduction in the headway or separation distance required between aircraft. The standard procedure in air flight control is to stagger aircraft flight patterns so that the trailing wake vortices have dissipated by the time another aircraft passes through the same area, but since wake vortices can maintain their structure for a long period of time over miles, the required separation distance between aircraft is large. To create that large separation distance or gap in air space, fewer flights are permitted to take off from or land at airports thus if there was a way to reduce or eliminate wake vortices, more flights could be fit into the same time frame thus increasing the capacity utilization factor for the airport and aviation operators who use the airport.

Aviation operations are predicted to continue to rise steadily in traffic volume, increasing the burden on already congested and constrained airports and aviation operator terminal areas. Airspace congestion has led to delays that inconvenience passengers, cost the aviation industry hundreds of millions of dollars each year, and will eventually limit growth capacity. The FAA mandated separation distances between aircraft are a major challenge to alleviating airspace congestion. A major factor governing the safe, minimum separation distance is the hazard generated by the long-lived concentrated wake vortex structures of a preceding aircraft.

The vorticity of any lifting or thrust-generating surface, wing or airfoil will be essentially constant for a given combination of Lift Coefficient and Aspect Ratio; different wingtip designs known in the art can move the site of the wingtip wake vortex only, they do not reduce the vorticity of the vortices that are shed at the wing tip thus the size and dissipation rate of the vortices is undiminished.

Winglets have been used to exploit the fact that the airflow in the wingtip vortex is at some angle to the direction of flight, and thus the associated static pressure vector (on the upper surface) is angled forwards of the span wise axis of the wing. If you place a vertical airfoil in the wake vortex at a positive angle of attack it will develop lift in a direction which has a component in the forward direction which is acting as "thrust" thus winglets extract some small amount of kinetic energy from the large scale concentrated wake vortex and convert it into thrust. The reduction in kinetic energy of the wake vortex is typically low, less than 7 percent. Winglets develop lift and thus actually increase the overall drag, but the amount of "thrust" they develop can exceed this drag, resulting in a net drag reduction of only a few percent.

Winglets must be placed at a specific angle with respect to the wake vortex helix angle generated in order to reduce the induced drag of the vortex wake's kinetic energy. If the angle is not correct then the winglets will add drag. Unfortunately the helix angle varies with airspeed of the aircraft, lift coefficient, air density and a few other external factors related to wind speed and direction, thermal and ground effects, so any fixed winglet can only be optimized for one specific flight configuration. This can be a problem because of changes in weight through the flight due to fuel burn wherein the lift coefficient steadily reduces as the fuel burns off. If traffic conditions allow, winglet-equipped airliners would ideally either climb or fly a carefully modulated airspeed regime to maintain a constant helix angle in the vortex, but this is not always possible. Other types of smaller aircraft fly in regimes that are too variable to accept this constraint thus winglets are not a practical solution.

The use of surface geometry such as riblets and/or compound riblets and/or 3 dimensional riblets and/or shaped riblets combined with trailing edge surface contour geometry to promote vortex-mixing of lifting or thrust generating body geometry at the trailing edge of an airfoil and into full-span ailerons or microflaps for example, would significantly reduce or prevent vortex-induced flutter of control surfaces and lifting or thrust-generating body structures and reduce the induced drag on a particular lifting or thrust generating body structure.

Minimum induced drag for any lifting or thrust-generating system requires an optimum dynamic surface loading. To accomplish this for aerodynamic applications, appropriately matched airfoils for the twist and cambered surfaces are essential. Furthermore, to minimize friction drag, the riblets and/or compound riblets and/or 3 dimensional riblets and/or shaped riblets surface chord combined with contoured trailing edge geometry of lifting or thrust-generating body geometry distribution must be held to lower limits but matched to the loading, while maintaining buffet margins. Adverse high speed effects which are associated with shock waves and flow separation, can be avoided by appropriate airfoil selection and placement of said riblets and/or compound riblets and/or 3 dimensional riblets and/or shaped riblets surface segments combined with contoured surface geometry of lifting or thrust-generating body geometry in relation to themselves and also, to the wing wherein said riblets and/or compound riblets and/or 3 dimensional riblets and/or shaped riblets surface combined with contoured surface geometry of lifting or thrust-generating body geometry must also be appropriately sized for the intended application. The reduction in induced drag is closely tied to contour surface geometry, structural load and design approach. For a given wing, there is an optimum riblets and/or compound riblets and/or 3 dimensional riblets and/or shaped riblets surface combined with contoured surface geometry of lifting or thrust-generating body geometry which will minimize drag and not exceed the wing's structural capability thus resulting in an overall reduction in wing span required which may be of design benefit. However, if the wing has structural capability not currently being utilized, the ultimate drag benefit can be even greater but with somewhat increased span. Obviously there are many ways to exploit the tradeoff between drag, span, structural margins and wing weight wherein selecting the appropriate combination for a specific application is a part of the design engineering process wherein incorporating riblets and/or compound riblets and/or 3 dimensional riblets and/or shaped riblets surfaces combined with contoured surface geometry of lifting or thrust-generating body geometry on aircraft within the normal flight envelope has shown impressive performance gains (e.g., more than 15% drag reduction) relative to the basic aircraft. Also, preliminary exploration of the trailing wake vortex behind said lifting or thrust-generating body geometry has indicates large decreases in wake vortex intensity and significant de-intensification that could substantially alter separation distance requirements between lead and following aircraft in airport traffic patterns. As a result the potential of contoured surface geometry of lifting or thrust-generating body geometry has greatly expanded and it is expected this new technology development will ultimately provide superior performance gains as well as operational benefits (e.g., increased safety, less noise, smaller space needs) in many applications where lifting or thrust-generating surfaces incorporating control surfaces such as stabilators, flaps, slats, elevons, flaperons, ailerons, elevators, rudders, trailing edge tabs, miniature trailing edge effectors or microflaps and other appendages such as body rakes.

Control of trailing vortex wakes of lifting or thrust-generating surfaces such as aircraft lifting or thrust-generating surfaces, rotors, submarine control planes, and propellers is important for both military and civilian applications. This patent concept involves a novel method for mitigating large adverse wake vortex effects using three-dimensional contour shaped surfaces applied to or incorporated into the trailing and/or leading edges and/or continuous across surfaces of the lifting or thrust-generating surfaces. The concept is built on an analysis effort that identified methods for introducing smaller vortices of periodic, time-varying strength to promote the de-intensification of the large primary wake vortex of lifting or thrust-generating surfaces such as used on submarines and aircraft. Large wake breakup using this "vortex-mixing" strategy indicates from computational fluid dynamic simulations that up to an order of magnitude increase in the dissipation rate of wake vortexes generated which is a significant advancement over any prior art effort in this area which will significantly impact air travel.

This result motivated the system and method that includes the design of asymmetrical scallop shapes that vary across the trailing edge for deflectable and/or non-deflectable surfaces that produce smaller wake perturbations. These shaped surfaces, exploit the mixing of the lower fluid stream and upper fluid stream of the lifting or thrust-generating surface such that the time and position of the fluid stream mixing is varied across the lifting or thrust-generating surfaces' trailing edge thus reducing the size and thus the duration of the wake vortex generated from said lifting or thrust-generating surfaces thus providing for a lifting or thrust-generating surface with a high lift force and high-deflection capabilities of deflectable surfaces. Thus this patent allows for improving overall flight performance of aircraft and improved submarine control planes and propeller cavitations with the added benefit of reduced drag and reduced noise due to the use of the vortex-mixing concept.

Aerodynamic drag can be further reduced on vehicles incorporating the invention by allowing for aerodynamic design improvements due to the configuration changes and the elimination of vortex induced drag and flutter. Vortex-mixing methods could be used within land vehicles such as, but not limited to, motorcycles, automobiles, trucks, trains, trailer and/or tractor section of a tractor-trailer to provide for a reduction in aerodynamic drag wherein surfaces are covered with drag reduction means incorporating various types of advanced riblet techniques such as compound riblets, three-dimensional riblets, and various shaped riblets (pyramid, rectangular and compound rectangular, tetrahedron and compound tetrahedron, Etc.) that may be combined in various combinations and/or compliant surfaces combined with surface contours that promote vortex-mixing.

Hydrodynamic drag can be further reduced on vehicles incorporating the invention by allowing for hydrodynamic design improvements due to the configuration changes and the elimination of vortex induced drag and flutter. Vortex-mixing methods could be used within water vehicles such as, but not limited to; hydrofoils, submarines, jet skis, amphibious vehicles, boats, and ships, to provide for a reduction in hydrodynamic drag.

Aerodynamic and hydrodynamic drag can be reduced on static structures such as bridges, buildings, oilrigs, and pipelines with internal and/or external fluid interactions.

BRIEF DESCRIPTION OF THE DRAWINGS

The invention is explained in greater detail below with reference to an exemplary embodiment that is illustrated in the accompanying figures.

DETAILED DESCRIPTION

The invention relates to lifting and/or thrust-generating bodies and/or surfaces which reduce the intensity of and the associated induced drag caused by the concentrated and long-lived trailing wake vortex structures generated at the root and tip region of finite span lifting or thrust-generating bodies or other surfaces by means of three-dimensional (x, y and z) contour surface geometries combined with surface treatments such as riblets which is intended to excite short-wavelength instabilities inherent in the vortex system produced to provoke an accelerated decay of the trailing vortices produced thus induce wake breakup and reducing the total kinetic energy of the vortex structures formed thus increasing the efficiency of said lifting and/or thrust-generating bodies and/or control surfaces that is combined with riblets of various types and/or compliant surfaces (passive and active) to form unique structures for various fluid dynamic control applications by means of producing many smaller vortices along the span of said lifting and/or thrust-generating body or other surfaces.

Figure 1:
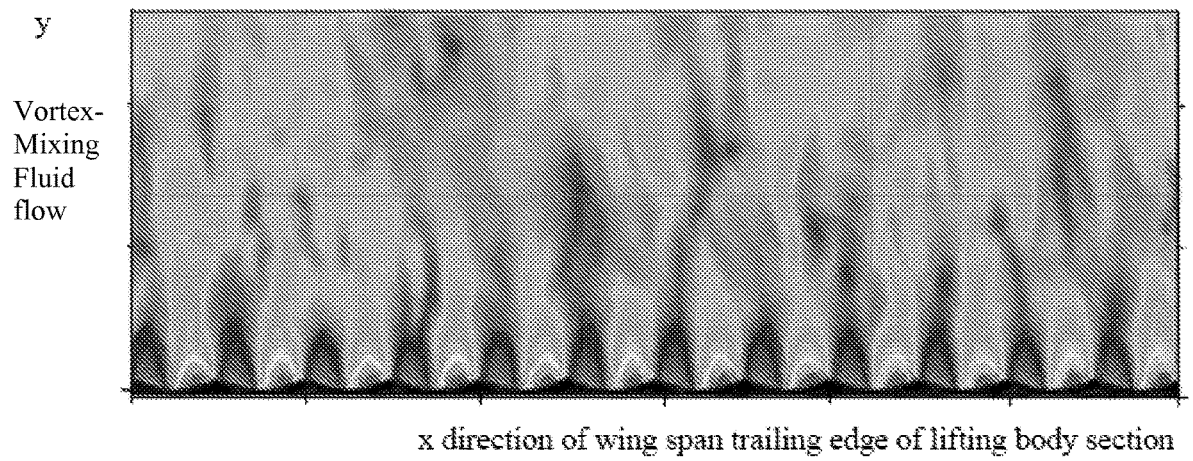
FIG. 1 is a cross sectional view of the vortex-mixing of trailing vortex wakes generated by a varied periodic three dimensional contour surface geometry of the trailing edge of a section of a lifting or thrust-generating body geometry in accordance with the invention wherein such variations in contour can also be in and/or out of the page.

The invention provides a method for mitigating wake vortex effects using shaped three dimensional (x, y and z) contour surface geometries of lifting and/or thrust-generating bodies or other surfaces wherein the contour surface of each individual contour change leads to the formation of counter-rotating vortices centered about each individual contour structure thus allowing for vortex-mixing of the low and high fluid velocity fields thus generating many smaller wake vortex structures along the span of said lifting and/or thrust-generating body or other surfaces that results in reduced kinetic energy of the wake vortex structures formed FIG. 1 thus reducing induced vortex drag for the purpose of fluid flow control dynamics that can be applied to various types of aerodynamic and hydrodynamic applications wherein fluid flow control has a wide range of applications within aerodynamic, hydrodynamic, energy and process industries.

Figure 6:
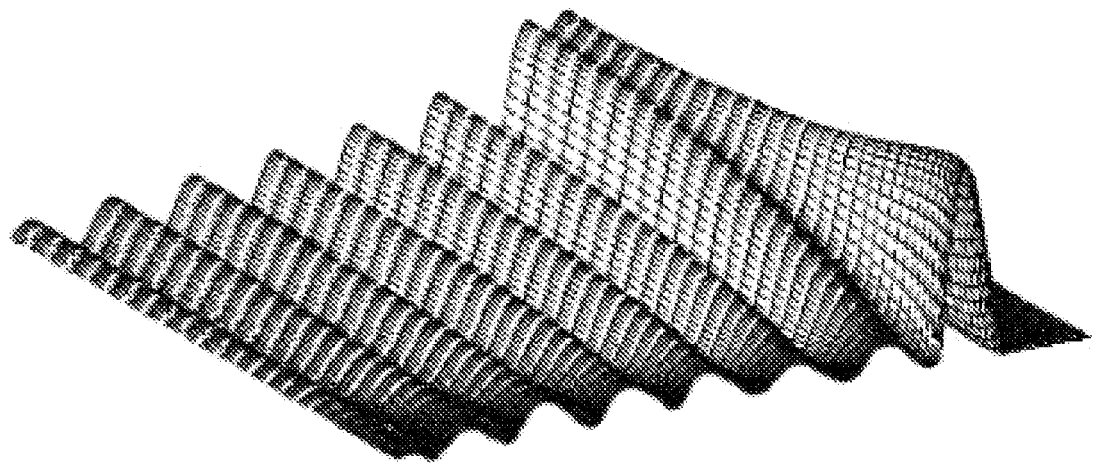
FIG. 6 is a perspective view showing one embodiment of a macroscopic contour surface that promotes vortex-mixing wherein the trailing edge is similar to that shown in FIG. 1 and can also represent a possible microscopic riblet surface structure.

Plane and circular fluid flow wakes and jets can be modified using active, passive and active-passive (hybrid) combinations that reduce induced drag due to wake turbulence. Active control can be achieved by exciting the flow by using either MEMS actuators and/or vibrating piezoceramic elements, whereas passive control can be achieved by placing of holes and/or mesh section, as shown in FIG. 6, on said lifting and/or thrust-generating bodies and/or surfaces.

Significant reduction in drag is obtained by combining active and passive devices with the lifting or thrust-generating body combined with contour trailing edge. The total drag of the passive and active methods combined with contour surfaces is smaller than that of any single element or method used alone wherein significant changes to the downstream fluid flow structure associated with different types of surface geometry modifications combined with active and passive fluid flow excitation can yield different useful implementations within fluid dynamic applications that promote the vortex-mixing strategy of producing many smaller wake vortices which is lacking in the current art.

Such vortex-mixing strategies can be combined with various types of advanced riblet techniques such as compound riblets, three-dimensional riblets, and various shaped riblets (pyramid, rectangular and compound rectangular, tetrahedron and compound tetrahedron, Etc.) that may be combined in various combinations and applied to surfaces which may be continuous and/or on the trailing and/or leading edges of the lifting or thrust-generating body or other surfaces which promote "vortex-mixing" along the span of the trailing edge of the lifting or thrust-generating body or other surfaces which reduces the duration and intensity of wake vortex effects generated by said lifting or thrust-generating body or other surfaces wherein various configurations are appropriate for fluid flow control applications within aerodynamics, hydrodynamics, energy and process industries such as aircraft, pipelines (inner and outer walls), cars, trucks, watercraft (aerodynamic and hydrodynamic applications), Ship hulls, missiles, windsurfers (aerodynamic and hydrodynamic applications), sleds, skis and other athletic equipment, athletic suits and apparel, among a mass of possible applications wherein textured surfaces using advanced riblet techniques combined with compliant surfaces (passive and active), combined with contoured surfaces alter the character of the fluid flow interactions such as to produce the desired affect of reduced vortex induced drag by means of vortex-mixing.

Vortex shedding in a concentrated circular cylinder wake introduces fluctuating unsteady cyclic stress called flutter that may cause catastrophic failure due to cyclic stress fatigue. Hence, control of vortex shedding using the vortex-mixing system and method using various possible combinations of textured surfaces combined with compliant surfaces combined with contoured surfaces that alter the character of the fluid flow interactions are considered for examples only and are not to be considered limiting in scope as to possible implementations or application limiting.

In the case of a textured surface combined with a contour surface geometry, the drag produced serves to dissipate lifting and/or propulsion power into the fluid (for example, riblets, compound riblets, 3 dimensional riblets and shaped riblets which may be combined and located on the contour surface geometry of a lifting or thrust-generating surface to reduce turbulent skin friction).

In the case of a passive compliant surface combined with a contour surface geometry part of the fluid flow energy goes into the surface itself and is dissipated through internal damping (for example, holes and/or compliant wall located on the contour surface geometry of a lifting or thrust-generating surface to activate its passive compliant properties by allowing for fluid flow to enter said holes and/or reduced localized pressure with compliant wall structure for the purpose of damping).

In the case of an active compliant surface and/or smart materials combined with a contour surface geometry wherein power would be required to activate the surface-boundary layer interaction (for example, actuation of MEMS devices located on the contour surface geometry of a lifting or thrust-generating surface to activate its compliant properties and/or the use of electric and/or magnetic fields and/or other smart materials technologies for integration include: shape memory polymers, shape memory composites, dynamic composites, dynamic syntactic foams, shape memory alloys, piezoelectric actuators, magneto-rheological fluids and solids, self-healing polymers and coatings for the purpose of creating morphing flexible contour shape surfaces and/or structures integrating adaptive materials into smart adaptive and/or morphing composite structures) wherein said active compliant surface and/or smart materials combined with a contour surface geometry can be applied to the active control of the thin boundary layer flow that exists on aerodynamic surfaces of aircraft and their propulsion systems wherein these boundary layer flows directly affects the performance of the aircraft buffet and limits maximum achievable performance whereby these boundary layers can be actively controlled during certain phases of flight to achieve performance benefits and not incur performance penalties at other stages of flight as is the case with more conventional passive fluid flow control systems.

In the case of contoured surfaces, the trailing vortex structures formed due to said contoured surfaces are caused to be disruptive to the formation of concentrated large-scale vortices and possible structures are represented in FIG. 1 and FIG. 6, which generate many smaller vortexes which promotes the vortex-mixing strategy instead of generating highly concentrated long-lived trailing wake vortex structures from the tip region of the lifting or thrust-generating body or other surface thus reducing the aerodynamic noise and drag due to the kinetic energy of the vortices formed within the fluid flow or fluid streams.

In terms of vortex strength and geometry current trailing wake vortexes are large and concentrated at the tip of a lifting or thrust-generating surfaces due to a secondary flow from the high pressure region below the lifting or thrust-generating body or other surface to relatively low-pressure region above causing fluid flow around the tip region of said lifting or thrust-generating body or other surface. A method is described for control of vortex spatial and temporal development on a lifting or thrust-generating body or other surfaces based on applications of three-dimensional contour geometric surface features that are combined with various riblet types and/or various possible combinations of textured or various riblet surface types which may further be combined with compliant surface types for improved vortex-mixing. The method relies on generating vortex-mixing, with spatial averaging according to the along-beam or spanwise direction of the lifting or thrust-generating body or other surfaces wherein the position and spacing of said contour geometric surface features can be varied in an oscillatory fashion affecting the parameters of vortex production such as circulation, position, and spacing. The essential underlying parameters are the vortex strength (or circulation energy) and position in space as a function of time. This method provides for vortex trajectories and strength as a function of the three-dimensional contour geometric shapes combined with various types of riblets and/or surface feature types such as compliant surfaces (active and/or passive) with dependence on degree of the geometric curvature, rate of change in curvature and/or deformation of the shapes used and interactions with the fluid or medium it is used in wherein such deformations are possible with compliant walls, shape memory alloys and/or MEMS actuators or other suitable actuators such as to provide dynamic shape changes to the various elements of the apparatus used.

The problem that currently exists in fluid dynamics is the problem of wake vortex effects, induced drag and wake induced cavitations that increases noise and drag which occurs at the lifting or thrust-generating surface tips or other surfaces wherein fluid moves from the area of high pressure (under the lifting or thrust-generating surface) to the area of low pressure (top of the lifting or thrust-generating surface). As a lifting or thrust-generating body or other surface moves through the fluid, this curling fluid flow action causes a spiralling vortex of fluid from the lifting or thrust-generating body or other surface tip as fluid spills from the high-pressure area into the low-pressure area which will disrupt the cord wise fluid flow over a lifting or thrust-generating surface thus reducing lift known as vortex induced drag or induced drag, thus a lifting or thrust-generating surface tip vortex seriously reduces efficiency, causing drag, and therefore a consequent penalty in increased fuel consumption and affecting performance and control capability.

The purpose of the method and apparatus is to introduce oscillatory structures that generate smaller vortices of periodic, time-varying strength along the span of the trailing edge of the lifting or thrust-generating body and/or surfaces to promote the de-intensification of the wake vortex structures formed by the lifting or thrust-generating body or other surfaces by causing a redistribution of the trailing wake vortex structure formed thereby, thus reducing the total kinetic energy of the wake vortex structures formed thus reducing the associated induced drag and when combined with riblets and/or compliant surfaces functions to significantly influence fluid flow across an aerodynamic surface or surfaces (e.g., body rakes, wings, sails, control surfaces such as stabilators, flaps, slats, elevons, flaperons, ailerons, elevators, rudders, trailing edge tabs, miniature trailing edge effectors or microflaps and other appendages) or hydrodynamic surfaces (e.g., Marine waterjet impellers, propellers, hydrofoils, submarine sails, bow-planes, rudders and other appendages) reducing vortex-induced cavitations and drag in hydrodynamic systems, as well as various rotating or rotary devices, including, but not limited to, mixers, propellers, impellers, turbines and blading, rotors, and fans wherein methods for mixing are improved such as fuel and air within a turbine engine.

There exist many candidate shapes for contour surface geometry for applications to trailing edge and/or leading edge surface and/or compliant surface and/or continuous surface shapes such as scallop shapes such as in FIGS. 1 and 6 and/or other possible contour shapes that promote the vortex-mixing strategy.

Figure 2:
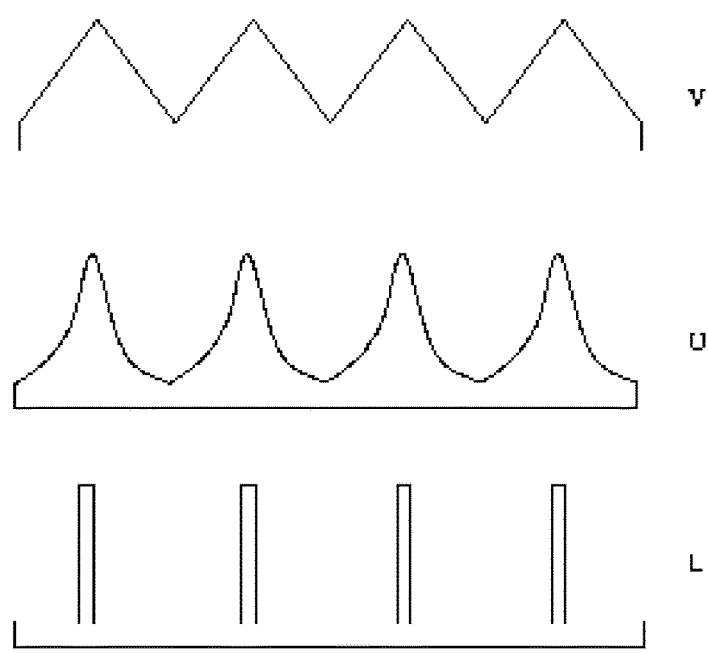
FIG. 2 is a cross sectional view of the Aerodynamic surface of a contoured surface geometry of lifting or thrust-generating body geometry in accordance with the invention.
Figure 3:
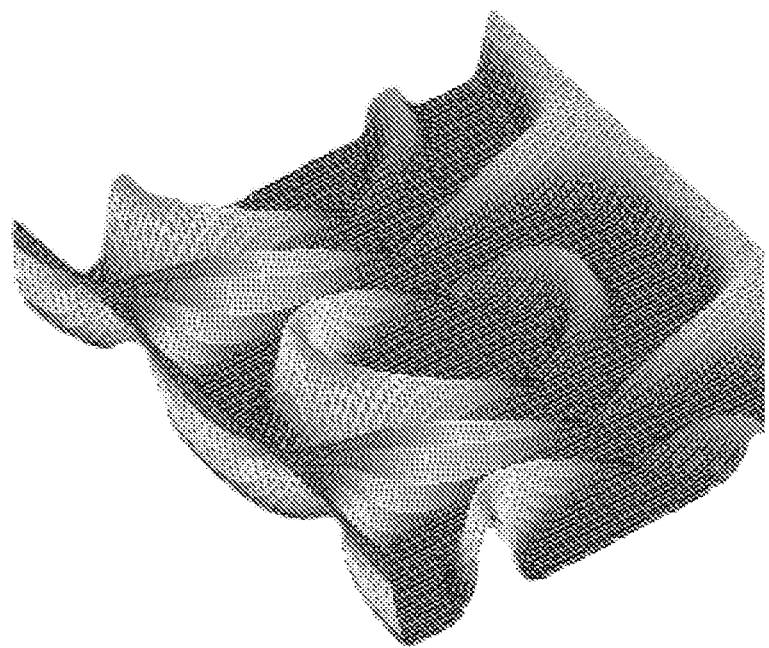
FIG. 3 shows a perspective view of one embodiment of a compound riblet structure.

Candidate shapes for riblets for applications to trailing edge and/or leading edge surface and/or compliant surface and/or continuous surface shapes are various types of advanced riblet techniques such as compound riblets, three-dimensional riblets, and shaped riblets (pyramid, rectangular and compound rectangular, tetrahedron and compound tetrahedron, Etc.) that may be combined in various combinations. Possible examples are shown in FIG. 2, FIG. 3 and FIG. 6.

Candidate shapes for contour surface geometry is variable for applications to trailing edge and/or leading edge surface and/or compliant surface and/or continuous surface shapes. Possible shapes are that of FIG. 1 and/or FIG. 6.

Figure 4:
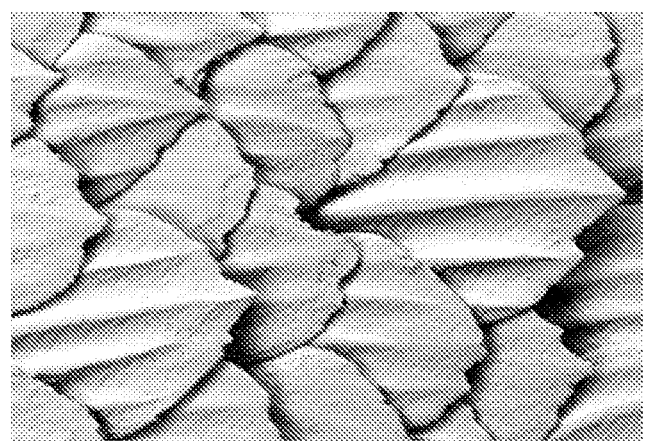
FIG. 4 is a magnified photographic view of sharkskin.

Candidate shapes for compliant surface geometry is variable for applications to trailing edge and/or leading edge surface and/or compliant surface and/or continuous surface shapes that are similar to that of fast swimming sharks called denticles FIG. 4 wherein each denticle is individually addressable as to actuation via a MEMS type of device or devices thus emulating the sharkskin surface geometry.

Figure 5:
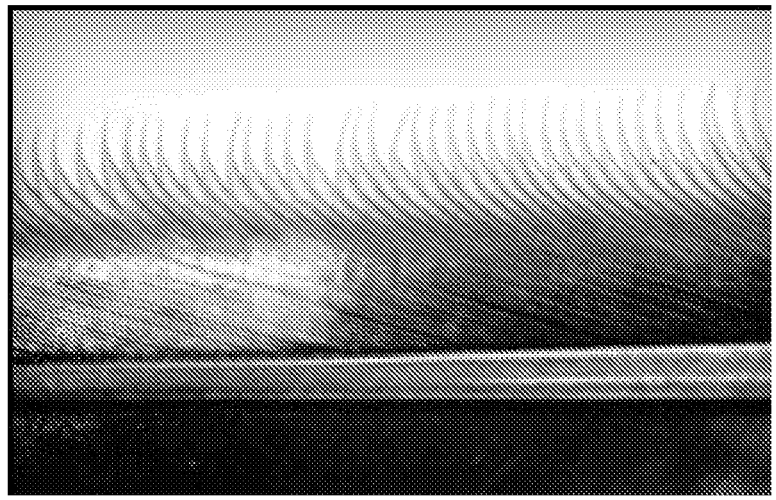
FIG. 5 is a magnified photographic view of an Owl feather.

Candidate shapes for contour surface geometry also includes serrations and/or saw-toothed serrations wherein possible shapes are as found in an Owl's feather such as is shown in FIG. 5. Such shapes would be modified to have an oscillatory profile, as shown in FIG. 1.

Candidate shapes for compound riblets include that of birds and/or fish and/or mammals with lifting or thrust-generating surfaces wherein one of the many possible shapes is shown in FIG. 3.

When a fluid flows past a solid body, a laminar boundary-layer forms and the boundary-layer transitions from laminar to turbulent at some point in time wherein the velocity fluctuations near the wall must die out, so there is always a small laminar sub-layer beneath the turbulent boundary-layer and the mixing properties of the fluid cause the gradient in the sub-layer to be much stronger than in fully-laminar layer fluid flow thus, transition of the boundary layer greatly affects drag.

Thus there is a need to control the boundary layer and there are several passive and active methods to achieve this goal such as Vortex Generators, Flaps/Slats, Absorbent Surfaces, Riblets, MEMS, Compliant Surfaces, Suction, Blowing, Binary Boundary-Layers, Jet-induced Turbulence, Planform Control and advanced methods such as Magnetodynamics, Electrodynamics and Feedback Control Systems wherein such known systems and methods can be combined with various contour geometries to promote and achieve efficient vortex-mixing.

Vortex generators are simply small rectangular plates that sit above the lifting body surface perpendicular to the lifting body itself. As air moves past them, vortices are generated from the tips of the vortex generators. These vortices interact with the rest of the fluid moving over the lifting body to increase the energy content of the fluid flow and help prevent boundary layer separation which causes a loss of lift and an increase in parasitic drag.

Nose flaps, Kruger flaps, and Slats are several types of leading edge devices used in airfoils which has an opening at the leading edge of the airfoil allowing high pressure fluid under the airfoil to mix with the low pressure fluid at the top surface thus increases the energy content of the boundary-layer at the top surface and help prevent boundary layer separation which causes a loss of lift and an increase in parasitic drag.

Slotted Flaps duct high-energy fluid flow from the lower surface to the upper surface of the boundary layer at the top surface and help prevent boundary layer separation and delay separation of the flow over the flap.

Absorbent surfaces and/or Ultrasonic surface modulation can delay boundary layer separation transition in hypersonic boundary layers, which would dampen modulations in fluid flow pressure.

Riblets can be used as drag reduction device used to control boundary layer turbulence by reducing turbulence intensities and Reynolds stress at the riblet wall with structure size on the order of tenths of a millimetre or smaller, which are similar to structures that are present on sharkskin with further benefits gained when combined with suction and/or blowing and/or MEMS devices along riblet surface. Beyond 15-degree misalignment with riblet axis, no significant benefits have been observed but flow misalignment effects can be alleviated with compound riblets, which are three dimensional and locally optimized to flow direction.

Compliant walls are flexible surfaces that absorb momentum that would otherwise be detrimental. Passive compliant walls absorb momentum without actuation, which is then damped internally. Active walls determine optimum absorption and actuate wall deflections accordingly, creating optimum boundary layer interactions.

Holes and/or porous surfaces are passive compliant surfaces that are highly effective in delaying boundary layer separation transition provided that the hole size is significantly smaller than the viscous boundary layer length scale.

Microelectromechanical Systems (MEMS) sensors detect condition of flow and manipulate or introduce vortices through MEMS actuators. Creation of controlled small-scale turbulence, drag benefits can be achieved which cause lower drag than laminar flow.

By supplying additional energy to fluid particles in the boundary layer that are low in energy, flow can remain attached to the surface. Two ways of accomplishing this are blowing high velocity fluid from inside the body and sucking low energy fluid from the boundary layer into the body.

Continuous blowing reduces wall shear stress and friction drag and if a different fluid is injected into the boundary layer, a binary boundary layer is formed over the surface, which can provide compliant wall properties to said surface. A binary boundary layer is formed when a fluid other than that of the outer flow is injected into the boundary layer wherein momentum and heat are exchanged in the boundary layer and mass is also exchanged through diffusion that introduces a concentration boundary layer wherein these boundary layers frequently occur in hypersonic flow.

Jet-induced Turbulence is accomplished by means of a series of jets spatially oriented at 45° in a plane transverse to the mean flow direction produces a series of counter-rotating vortices creating long channels of turbulent attached flow due to the high rotational energy of the jet flow.

Figure 7:
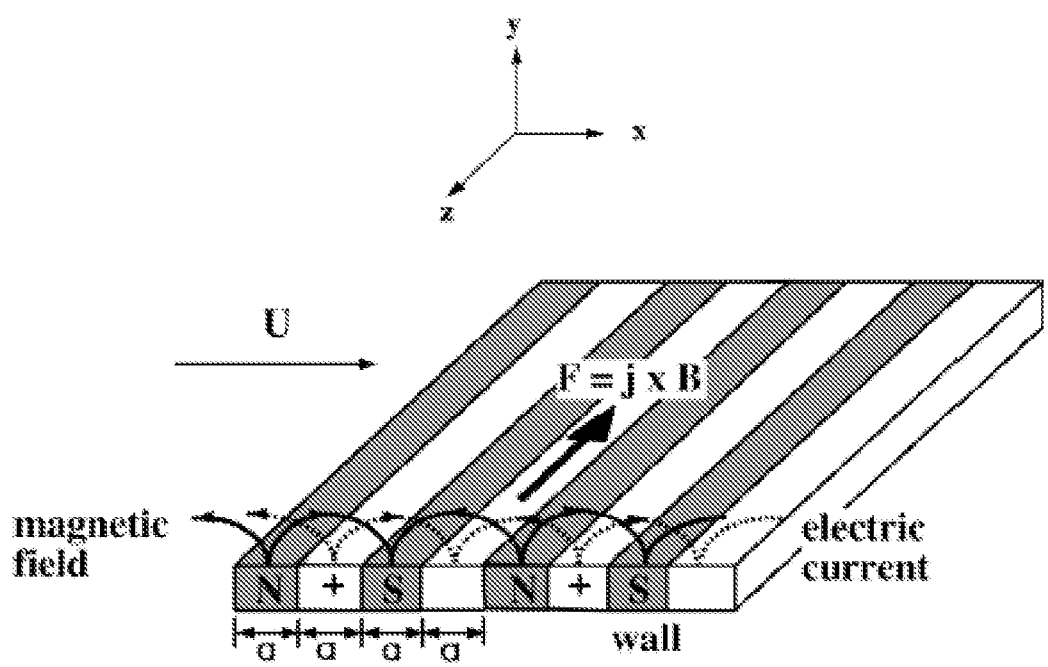
FIG. 7 shows a perspective view of a structure of Magneto-Fluid-dynamic Control that incorporates the use of Lorentz Force.
Figure 8:
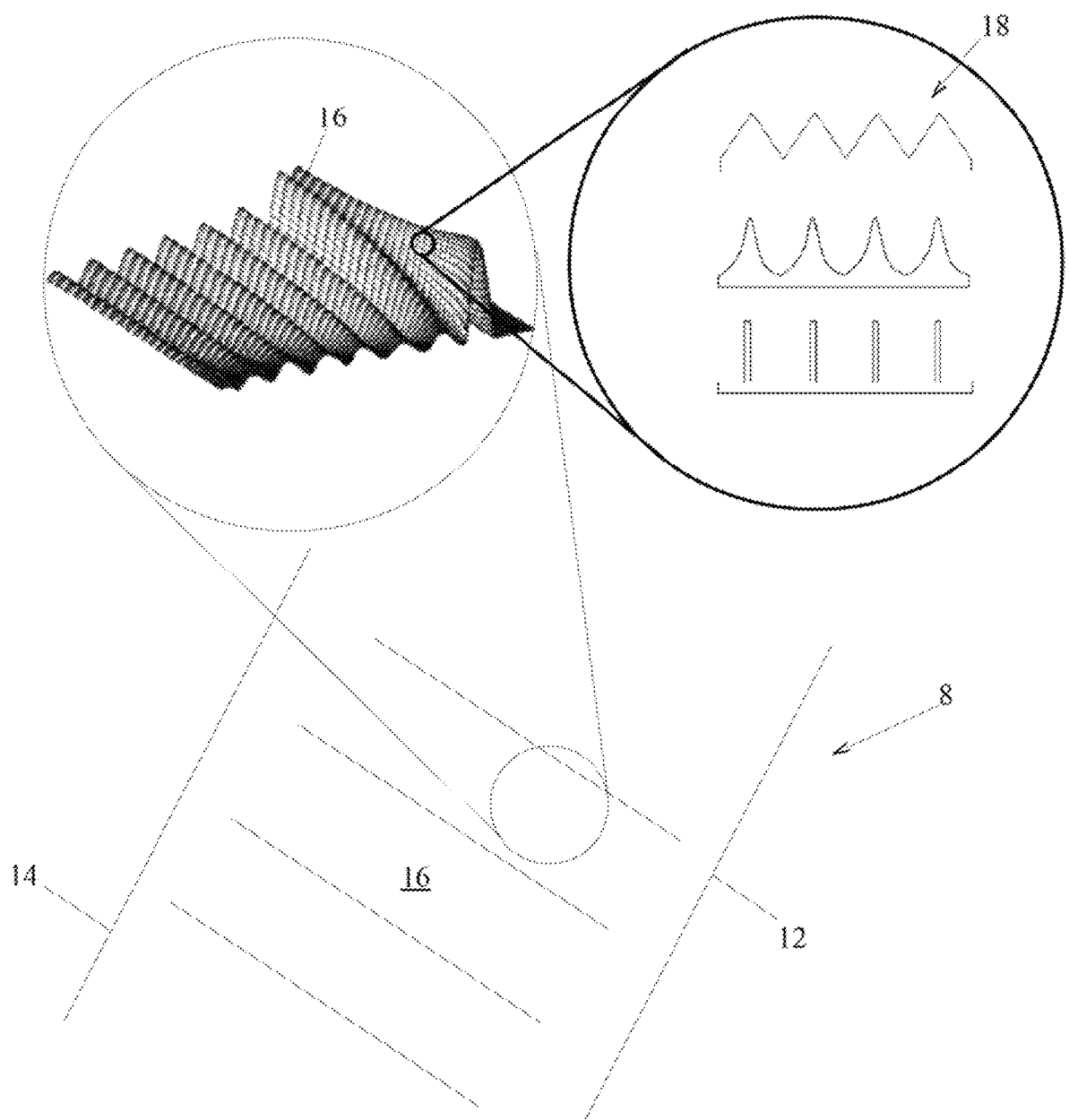
Figure 9:
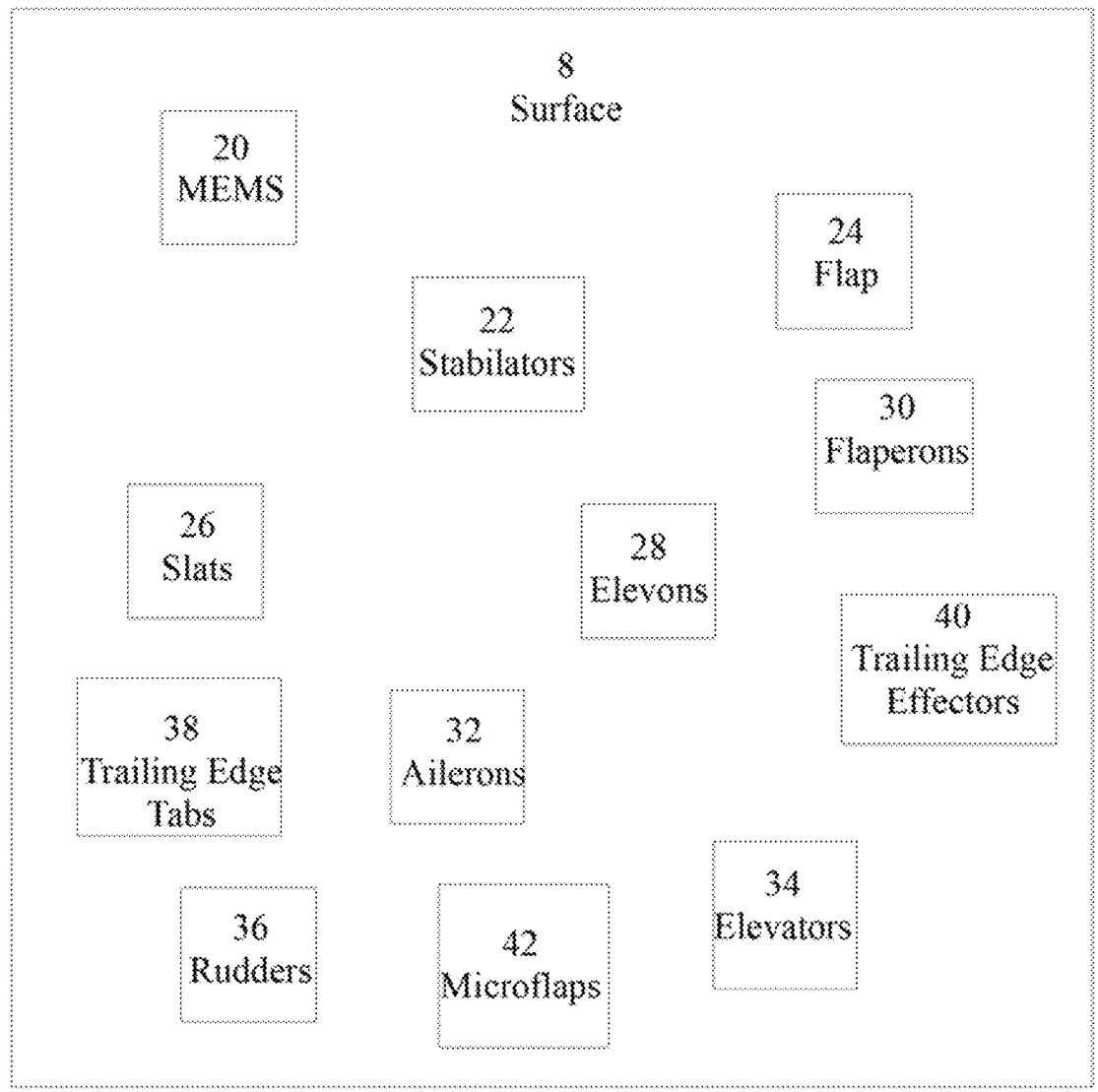

Magneto-Fluid-dynamic Control can be applied using Lorentz Force: The force induced by motion of charge (current) through a magnetic field wherein this principle affords flow control when an electrically conducting fluid flows through an electromagnetic field. By embedding electrodes and magnets in a flat surface over which flow passes, the Lorenz force can be produced FIG. 7. The key to drag reduction is to disturb the semi equilibrium state between the near-wall stream wise vorticies and the wall and introducing Lorentz force perturbations perpendicular to the vorticies can effectively accomplish this.

Electro-Aerodynamic Control can be applied using Coulomb's Law: opposite charges attract with a force directly proportional to the charge magnitudes wherein this principle affords flow control when a layer of ionized gas and a longitudinal electric field are generated within the boundary layer. The methods for controlling the profile of the boundary layer uses space-time electric-field modulation which is equivalent to an effective viscous damping effect which delays the growth of the transition region instability wherein the perturbations can be induced by injection (blowing ionized air) wherein the system is combined with suction at the rear of the airfoil.

Benefits of combining the above methods with that of various contour surface geometries used for vortex-mixing is that you are able to eliminate counterproductive large scale vortices thus providing optimum control.

When the vorticity of the large-scale vortex structures grow in size the associated aerodynamic drag and noise level increases. Various physical structures can cause a disruption in the formation of large-scale vortices such as the structure of an owl's feather, which has many small saw-toothed feather serrations, and these serrations generate many smaller vortexes instead of large concentrated high kinetic energy vortex structures within the airflow thus reducing the aerodynamic noise and drag due to vortices forming in the airflow.

Thus there exist physical structures in nature, such as birds' wings and feathers and/or fish and/or mammals, with lifting or thrust-generating surfaces wherein the structural shapes provide for reduced drag and such structures can be combined with contour surface geometries which are variable in all 3 dimensions: X, Y and Z wherein such structures found in nature can be emulated and combined to create new and unique physical structures. Specifically the amount, distribution and size of the contour surface geometry combined with riblets, compound riblets, 3 dimensional riblets, shaped riblets, compliant surfaces produce a defined variable trailing edge curvature, contour shape, twist and/or camber and rate of curvature modifications can achieve performance improvements within various applications. One such application is discussed for aircraft applications with the aid of Computational Fluid Dynamics (CFD) analyses.

Computational Fluid Dynamics (CFD) analyses of wake vortex breakup using this "vortex-mixing" strategy for aircraft applications were undertaken, and demonstrates up to an order of magnitude or more increase in the dissipation rate of the induced smaller vortices which also significantly reduces the energy intensity of the wake vortex structures generated and allows for new control strategies to be designed based on such new lifting or thrust-generating body and surface geometries wherein such new control strategies can be based on such new surface geometries that may include various types of active compliant surfaces such as MEMS devices and/or passive compliant surfaces creating an advanced fully integrated manoeuvring control system that help vehicle operators operate more safely and effectively by more precisely controlling the forces between control bodies and the fluid wherein such control systems are suitable for use in aerodynamic and hydrodynamic control of forces thus allowing for advanced control system designs that can help aircraft designers implement aircraft designs that aircraft operators can operate more safely and effectively eliminating wing and control surface "flutter" due to wake vortex induced oscillations and allow for more precise control of the forces acting upon the lifting and/or thrust-generating body and/or other surfaces and are suitable for use in aerodynamic and hydrodynamic control of forces.

An example of this would be to have MEMS devices across a lifting or thrust-generating body that are similar to that of the denticles of a shark wherein each individual denticles structure is a MEMS actuated structure that would emulate the sharkskin for the purpose of control flight dynamics wherein actuation upward into the fluid flow and/or downward out of the fluid flow would increase or decrease drag and cause the aircraft to experience an increase or decrease in drag torque applied to the lifting or thrust-generating body thus with the actuation of said MEMS structures into and out of the fluid flow such that they would impart a change in torque of said lifting or thrust generating body and thus cause a direction change of an aircraft for example, thus allowing for flight control in the desired direction by the operating pilot of the aircraft without the need for other flight control surfaces or to increase the capability of flight control surfaces.

Future aircraft and watercraft could benefit significantly from the application of fluid flow vortex-mixing control, which offers not only improvements in absolute performance envelope increase, increased agility, and reduced fuel burn but also the potential to reduce vehicle size, weight and cost. This invention allows for controlling fluid flow to achieve a desired effect such as drag reduction or lift enhancement incorporating passive and active techniques to produce the desired effect with a minimum of energy expenditure by the propulsion device used by combining these techniques with contour surface geometries that promote the vortex-mixing strategy.

Reduction of skin friction drag in turbulent boundary layers can be accomplished by the use of compliant surfaces and/or actuators and control algorithms and sensors to favorably modify the velocity profile of a fluid flow close to the physical surface for boundary layer control. The dynamic compliant surface may consist of MEMS actuator devices and arranged into an actuator array, which can be constructed of individually addressable piezoelectric cantilevers or other suitable MEMS actuator devices which can be integrated with riblets and cavities emulating the structure of shark skin FIG. 4 wherein the MEMS devices are driven at various frequencies and/or at resonance to maximize their displacement and thereby the actuator effectiveness. The riblet structure of each MEMS actuator leads to the formation of counter-rotating vortices centered about each individual riblet structure thus allowing for disturbance velocity fields to be generated by an actuator in a laminar boundary layer which results in control of perturbed laminar boundary layers for the purpose of fluid flow control dynamics that can be applied to aerodynamic applications such as fight control and/or drag reduction and can be applied to hydrodynamic applications such as hydrofoils, bow planes, submarine or ship outer hulls etc.

Micro and nano machining and electromechanical fabrication allow for the application of distributed roughness to delay cross-flow instabilities and Active Control of Tollmien-Schlichting instabilities by mass-less jets/surface actuation.

Riblets have been identified as a mature technology that could to give modest reductions in aircraft drag wherein surface finishes which may be machined or fabricated into the aircraft structure wherein the use of using nano and/or micro scale electro mechanical systems to control the development of turbulent structures in the boundary layer and so reduce drag and include turbulent skin friction reduction by low drag nano-scale surface finishes and turbulent drag reduction by active control of turbulent structures using mass-less jets/surface actuation. Turbulent structures may also be controlled using energy deposition (plasmas).

Variable shape control may be achieved through trailing edge camber tabs and mini-trailing edge devices or by means of shape memory alloys and shock control by implementing surface adaptation.

The invention described herein by references to uses and applications is suitable for use in aerodynamic applications for vehicles such as, but not limited to; aircraft, motorcycles, automobiles, trucks, tractor-trailers, trains, projectiles, missiles, rockets and various other types of aircraft and for use in hydrodynamic applications for vehicles such as, but not limited to; hydrofoils, submarines, torpedoes, ships, boats and other types of watercraft. However, the invention is not limited to vehicles, and may be applied to reduce drag forces on stationary non-mobile bodies such as oil rigs, piping (internal and/or external wall), bridges, buildings or other fluid interacting systems such as mixers, heat exchangers etc. wherein such fluid dynamic applications are intended to be within the scope of the invention.

The present invention is applicable to any type of fluid flow conditions where there exist fluid flow interactions with a physical surface such as lifting or thrust-generating bodies or other surfaces with contoured surfaces that may be combined with riblets and/or passive and/or active compliant surfaces. It is therefore understood that the invention may be practiced otherwise than specifically described such as within fluid mechanics, heat transfer, thermodynamics, combustion, fluid dynamics, micro fluidics, molecular physics, physical chemistry, bio-fluidics, and electrostatic and electromagnetic fields applied to fluid flow phenomena.

FIG. 1. Shows the cross sectional view of the x direction or spanwise direction of a trailing edge of a lifting or thrust-generating body wherein the length of the chordwise direction or y direction shows the variation in cord length of the trailing edge of a lifting or thrust-generating body and shows the efficient mixing of the upper and lower fluid steams combining to form smaller vortices distributed along the length or span of a section of a lifting or thrust-generating body.

The effect of the spanwise wake vortex-mixing strategy is two fold; first to reduce the induced drag and oscillatory effects (flutter) upon the lifting or thrust-generating body and control surfaces and second to significantly reduce the total kinetic energy of the trailing wake vortex and prevent or significantly reduce the formation of the concentrated trailing wake vortex generated at the tip of the lifting or thrust-generating body structures which is unique in the area of lifting or thrust generating body surfaces and fluid dynamic control.

In the preferred embodiment, The trailing edge of the lifting or thrust-generating body geometry is such as to vary in cord length along the span of said lifting or thrust-generating body structures in an oscillatory fashion wherein the resulting geometry can take various forms which may or may not be periodic in nature such as sinusoidal form, that can vary in peek position of said sinusoidal form along the spanwise direction or may be constant in peek position of said sinusoidal form along the spanwise direction or any combination thereof wherein there exist oscillatory structures within larger oscillatory structures, etc.

FIG. 2 shows the possible geometries of riblet and/or compound riblet surfaces used to accomplish the control of the chord wise fluid flow.

In the case of providing improved lifting or thrust-generating body performance it is preferred to combine riblet and/or compound riblet and/or shaped riblet surfaces with spanwise vortex-mixing strategy.

Riblet and/or compound riblet and/or three dimensional riblets and/or shaped riblets surfaces are well known in the art and can be combined within various combinations with spanwise vortex-mixing strategy to achieve the benefits of improved levels of vortex-mixing capability.

The possible forms of lifting or thrust-generating body geometries and riblet and/or compound riblet surface geometries may be summarized as follows. Generally the lifting or thrust-generating may be either stationary or rotary in which the lifting or thrust generating may be incorporated into the various aerodynamic and hydrodynamic structures. One such possible structure is a riblet and/or compound riblet or slotted laminated or composite surface material combined with the lifting or thrust generating body three-dimensional contour geometry that has a varied and periodic structure such as shown in FIG. 1. Another possible structure is a slotless structure in which the lifting or thrust-generating body structure wherein cord length is varied in a oscillatory fashion continuously across the span of the lifting or thrust-generating body trailing edge in a manner that can be defined as periodic and/or non-periodic. A further possible structure is a lifting or thrust-generating body structure in which a high voltage is applied within a conducting material, which promotes cord wise fluid flow as with the various riblet surface structures and may be combined with various compliant surface structures as well. Riblet and/or compound riblet and/or three-dimensional riblet and/or shaped riblet surfaces for a lifting or thrust-generating body structure may be of printed type and/or stamped from a sheet material that can be applied to a lifting or thrust generating body surface after construction or as part of the manufacturing process wherein the surface features are molded directly into the surface as for example a master mold could have such micro surface features combined with three-dimensional contour geometry macro surface features as part of a mold for replication purposes as with a composite type of material.

Uses

In current tilt rotor aircraft operating in the hover mode, the wake impinging on the lifting or thrust-generating surface surfaces causes high pressures on the upper surface. The flow spreads out, with part of it going over the trailing edge, and part over the leading edge. As transition to forward flight occurs, it is important to reduce the upper surface pressure early, so as to establish a lifting or thrust-generating laminar fluid flow field over the lifting or thrust-generating surface or surfaces. Thus, the tendency of the impinging flow to spread out over the leading edge must be reduced.

Lifting surfaces comprised of geometric surface features integrated into lifting surfaces such as to minimize the induced drag effects associated with concentrated vorticity wake effects that trail from said lifting surfaces. The geometry surface features, includes variations in macroscopic, microscopic and nanoscopic geometric shape with respect to the trailing and/or leading edge wherein the trailing and/or leading edge geometry is applied at appropriate locations that can induce or promote turbulent chord wise fluid flow over the lifting surface and/or promote chaotic fluid mixing of the fluid flow trail such that it reduces the generation of long lived concentrated wake vortex energy which trails from the wing thus avoid potentially hazardous wake encounters for other aircraft. More generally the system and method is a generic geometry modification of lifting surfaces to achieve drag reduction for lifting surfaces such as helicopter and tilt-rotor blades, airfoils, and propeller or rotor blades that can also be applied to hydrodynamic applications such as sail planes, propellers and rudders for submarines or other watercraft applications such as hydraulic jets, hydrofoils or ships.

The fluid flow field in the rotor wake/lifting or thrust-generating surface interaction region is dominated by interacting tip vortices and vortex sheets generated by the rotor, with large amplitude, periodic variations in each component.

Varying the lifting or thrust-generating body contour and surface feature geometry on a lifting or thrust-generating surface such as on rotor blades on propeller driven aircraft such as the V-22 Osprey can have a significant impact on operational performance. The V-22 is required to operate in flight conditions ranging from hover and low speed edgewise flight to high speed cruise. The trailing edge shape of the blade, which promotes vortex-mixing, will effectively allow in-flight optimization of the blade structure. Candidate shapes for this trailing edge shape were explored with variations in contour structure geometry such as period of placement, size, rate and shape of curvature changes in the x, y and z coordinate axis. Computational fluid dynamics software was used to determine performance improvements for representative flight conditions, and to quantify the required amount and distribution of trailing edge shapes, sizes, twist and/or camber required wherein power consumption, stress, and sizing calculations were conducted for variable trailing edge geometry designs.

Overall results indicate that the on-blade riblet and/or compound riblet surface geometry combined with spanwise wake vortex-mixing structures could increase mission radius by 15 percent or more and provide for a payload increase of over 1200 lbs. thus providing for future mission growth while avoiding potentially expensive upgrades of the drive system.

In aircraft applications the vortex-mixing strategy can be applied to rotor, airfoil surfaces and other surfaces wherein the vortex-mixing improves lifting or thrust-generating or control surfaces performance capability by reducing induced drag that also reduces noise levels through such vortex-mixing structures and strategies wherein the resulting contour geometry can take various candidate shapes with variations in structure geometry such as period of placement, size, rate and shape of curvature changes in the x, y and z coordinate axis along the spanwise direction of the lifting or thrust-generating body wherein there can be applied combinations of varied structure geometry such as period of placement, size, rate and shape of curvature changes in the x, y and z coordinate axis along the spanwise direction of the lifting or thrust-generating body combined with various advanced riblet structures.

In the case of helicopter applications and/or tilt-rotor aircraft the benefit of noise reduction and increased payload performance is possible. Among several helicopter noise mechanisms that can be mitigated are blade-vortex interactions (BVI) causing low frequency noise and becomes dominant during low speed descent and maneuvering flight, wherein the rotor wake is blown back into the rotor plane creating a WOP-WOP effect that is very high in sound pressure level creating an uncomfortable affect on human hearing.

Another use embodiment uses leading edge and trail edge geometry wherein the lifting or thrust-generating body member may be constructed as described above in the trailing edge case of the previous case wherein such surfaces features and geometry are applied to entire surface.

Another use embodiment uses leading edge as opposed to trailing edge geometry wherein the lifting or thrust-generating body member may be constructed as described above in the trailing edge case of the previous embodiment.

Another use embodiment uses a continuous geometry wherein lifting or thrust-generating body may be used within a mixing process such that the rotor or mixing blades induces more homogeneous mixing results such as fuel and air within a gas turbine.

Another use embodiment uses a combination of surface features and contours that are used to reduce drag by controlling the flow and mixing characteristics of a lifting body or thrust generating body such that flow oscillations are significantly reduced resulting in the desirable effect of reduced noise and pressure fluctuation which cause flutter modes thus reducing flutter of said lifting body or thrust generating body.

Another use embodiment uses the combination of a lifting body or thrust generating body with a contour system with that of a MEMS dynamic surface control system is used on said lifting body or thrust generating body wherein a number of MEMS devices comprised of sensors and actuators are arranged at various points along the combined span length and chord length.

Another use embodiment uses the combination of a lifting body or thrust generating body with a contour system with elliptical surface contours used on said lifting body or thrust generating body wherein a number of elliptical geometries made from shape memory alloy material can change its geometry varying within the x, y, and z axis are arranged at various points along the span length of said lifting or thrust-generating body.

Another use embodiment uses the combination of a lifting body or thrust generating body with a contour system with chevron surface contours used on said lifting body or thrust generating body wherein a number of chevron geometries made from shape memory alloy material can change its geometry varying within the x, y, and z axis are arranged at various points along the span length of said lifting or thrust-generating body.

Various changes may be made in the shape, size, arrangements and placements of the various elements without departing from the spirit and scope of the invention such as additional shapes and/or geometric configurations for the purpose of promoting the vortex-mixing strategy.

Any combination of the above embodiments may be used in addition to that of other applications within the area of fluid dynamics.

Although exemplary embodiments of this invention have been described, it in no way limits the scope within this invention. Those skilled in the art will readily appreciate that any modifications are possible and are to be included within the scope of this invention as defined in the following claims. In the claims, where means plus function clause are used, they are intended to cover the structural concepts described herein as performing the recited function and not only structural equivalents but also equivalent structures.

The method of the invention as described herein above in the context of the preferred embodiments is not to be taken as limited to all of the provided details thereof, since modifications and variations thereof may be made without departing from the spirit and scope of the invention. For example, the principles of the invention in their broader aspects may be applied to other fluid dynamic systems for structures or vehicles, which may require drag reduction and/or improved fluid control.

What is claimed is:

1. A wing apparatus having geometry that promotes vortex-mixing for mitigating the formation of concentrated wake vortex structures, comprising:
a solid body, a surface of which has a leading edge and a trailing edge,
wherein the solid-body surface comprises a contour surface geometry that varies in curvature in all three dimensions,
wherein the solid-body surface has oscillatory variations in chord length due to the contour surface geometry, and wherein the oscillatory variations are continuous across the entire span of the solid-body surface, wherein the oscillatory variations are configured to produce multiple wake vortices smaller than concentrated vortex structures generated at a tip region of the solid-body surface in the absence of such oscillatory variations.

2. An airfoil body having geometry that promotes vortex-mixing for mitigating the formation of concentrated wake vortex structures, comprising:
a solid-body, a surface of which has a leading edge and a trailing edge,
wherein the solid-body surface comprises a contour surface geometry that varies in curvature in all three dimensions,
wherein the solid-body surface has oscillatory variations in span length due to the contour surface geometry, and wherein the oscillatory variations are continuous across the entire chord of the solid-body surface, wherein the oscillatory variations are configured to produce multiple wake vortices smaller than concentrated vortex structures generated at a tip region of the solid-body surface in the absence of such oscillatory variations.

3. The apparatus of claim 1, wherein the contour geometry is periodic and varies in peak position along the span.

4. The apparatus of claim 3, wherein the contour geometry is a sinusoidal form.

5. The apparatus of claim 1, wherein the contour geometry comprises a plurality of structures, wherein the plurality of structures vary in at least one of: period of placement of said structures, size of said structures, and rate and shape of curvature changes in the x, y and z coordinate axis.

6. The apparatus of claim 1, further comprising: riblets applied to the solid-body surface to promote vortex-mixing along the span of the trailing edge, wherein the vortex mixing reduces the duration and intensity of wake vortex effects generated by the apparatus.

7. The apparatus of claim 1, further comprising a plurality of MEMS devices, each comprising sensors and actuators, that are arranged along the chord length of the solid surface.

8. The apparatus of claim 1, further comprising a plurality of MEMS devices, each comprising of sensors and actuators, that are arranged along the span length of the solid-body surface.

9. The apparatus of claim 1, further comprising A plurality of MEMS devices, each comprising sensors and actuators, that are arranged along the span length and chord length of the solid-body surface.

10. The apparatus of claim 1, wherein the contour surface geometry is defined by the oscillatory variations, and wherein the oscillatory variations are periodic and vary in amplitude and peak position along the span of the solid-body surface.

11. The apparatus of claim 9, wherein the MEMS comprise a means for time-varying deflection based upon a sensor input of said MEMS.

12. The apparatus of claim 11, wherein perturbations occur at varying frequencies and amplitudes at each of the plurality of MEMS devices.

13. The apparatus of claim 11, wherein perturbations occur at varying frequencies and amplitudes within grouped arrays of the MEMS devices.

14. The apparatus of claim 1, wherein solid-body surface comprises at least one of: MEMS actuators, stabilators, flaps, slats, elevons, flaperons, ailerons, elevators, rudders, trailing edge tabs, miniature trailing edge effectors and microflaps.

15. The apparatus of claim 1, wherein the contour surface geometry has a curvature determined as an inverse function of the vortex cross flow velocity, whereby the angle of curvature permits for a relative reduction in drag.

16. The apparatus of claim 1, wherein the surface comprises means of suction to provide for boundary layer control.

17. The apparatus of claim 1, wherein the surface comprises surface features and contours configured to reduce drag and flow oscillations, thereby resulting in the reduction of noise and pressure fluctuations.

18. The apparatus of claim 1, further comprising:
means for active control; and
means for passive control, which reduce induced drag due to wake turbulence, wherein the active control means are achieved by at least one of MEMS actuators and vibrating piezoceramic elements, and wherein passive control means are achieved by placing holes and a mesh section on the leading edge, thereby providing for turbulence enhancement and suppression in plane and circular-jet mixing fluid flow layers.

19. The apparatus of claim 1, wherein the solid-body surface further comprises a contour system with elliptical surface contours, wherein the contour system is made from shape memory alloy material, which changes the geometry of the contour system within the x, y, and z axis, and wherein the contour system is arranged at various points along the span length of the solid-body surface.

20. The apparatus of claim 1, wherein the solid-body surface further comprises a contour system with chevron surface contours, wherein the contour system is made from shape memory alloy material, which changes the geometry of the contour system within the x, y, and z axis, and wherein the contour system is arranged at various points along the span length of the solid-body surface.

21. The apparatus of claim 1, wherein the apparatus is an aircraft airfoil.

22. The apparatus of claim 21, wherein: said airfoil is a wing.

23. The apparatus of claim 1 wherein: the apparatus is an aircraft propeller.

24. The apparatus of claim 1, wherein: a passive compliant surface is combined with the contour surface geometry such that part of the fluid flow energy extends into the surface and is dissipated through internal damping.

25. The apparatus of claim 24, wherein said passive compliant surface comprises holes and a compliant wall located on the contour surface geometry.

26. The apparatus of claim 1, wherein the surface comprises an active compliant surface combined with the contour surface geometry, and wherein said active compliant surface combined with the contour surface geometry is applied to a thin boundary layer flow.

27. The apparatus of claim 1, wherein: the surface is configured to introduce vortices of periodic, time-varying strength along the span of the trailing edge of the surface to promote de-intensification of wake vortex structures formed by the surface.

28. The system in accordance with apparatus of claim 1, wherein the surface comprises passive compliant surfaces combined with the contour surface geometry, which causes fluid flow energy to flow into the surface, and wherein the fluid flow energy is dissipated through internal damping therein, caused by holes located on the contour surface geometry of the surface.

29. The apparatus of claim 1, wherein the leading edge comprises at least one of a nose flap, Kruger flap, and Slats, and wherein the leading edge has an opening which allows high pressure fluid under the surface to mix with the low pressure fluid at the top of the surface, thereby increasing an energy content of a boundary-layer at the top of the surface and preventing boundary layer separation.

30. The apparatus of claim 1, wherein said oscillatory variations are configured to generate vortices of periodic, time-varying strength along the span of the trailing edge to promote de-intensification of wake vortex structures formed by the apparatus wherein oscillatory variations reduce the total kinetic energy of the wake vortex structures formed.

31. The apparatus of claim 1, wherein the surface, the leading edge and the trailing edge have a scallop-shaped contour surface geometry.

32. The apparatus of claim 1, wherein the surface comprises riblets, and wherein the riblets are at least one of pyramid-shaped, rectangular, compound rectangular, tetrahedron and compound tetrahedron.

33. The apparatus of claim 1, wherein the surface comprises a plurality of denticle-shaped surfaces, and wherein each denticle-shaped surface is individually addressable as to actuation via a MEMS device.

34. The apparatus of claim 28, wherein the passive compliant surfaces are flexible surfaces that absorb momentum without actuation.

35. The apparatus of claim 34, wherein the passive compliant surfaces are porous surfaces that delay boundary layer separation.

36. The apparatus of claim 1, wherein the surface comprises electrodes and magnets, and wherein Magneto-Fluid-dynamic Control is applied using Lorentz Force, wherein the force is induced by a motion of charge through a magnetic field.

37. The apparatus of claim 32, wherein the riblets are stamped from a sheet material that is applied, wherein the riblets are applied to the apparatus as part of the manufacturing process, and wherein the riblets are molded directly into the apparatus.

38. The apparatus of claim 32, wherein a voltage is applied to the apparatus to promote chordwise fluid flow with the riblets.

39. The apparatus of claim 1, wherein the position of the trailing edge varies in the chordwise direction along the span of the apparatus in an oscillatory fashion.

40. The apparatus of claim 1, wherein distributed roughness is applied across the surface by micro and nano machining and electromechanical fabrication to delay crossflow instabilities and active control of Tollmien-Schlichting instabilities.

41. The apparatus of claim 1, wherein the surface comprises compliant surface and actuators to reduce skin friction drag in turbulent boundary layers.

42. The apparatus of claim 26, wherein the active compliant surface comprises MEMS actuator devices arranged into an actuator array, which are constructed of individually addressable piezoelectric cantilevers, and wherein the MEMS actuator devices are integrated with riblets.

43. The apparatus of claim 42, wherein the MEMS actuator devices are driven at various frequencies and at resonances to maximize the displacement of the MEMS actuator devices, wherein each of the riblets each comprising the MEMS actuator devices causes the formation of counter-rotating vortices centered about each individual riblet.

44. The apparatus of claim 1, wherein the trailing edge comprises asymmetrical scallop-shaped surfaces, and wherein the scallop-shaped surfaces are configured to exploit the mixing of a lower fluid stream and an upper fluid stream of the surface such that the time and position of the fluid stream mixing is varied across trailing edge.

45. The apparatus of claim 1, wherein the contour surface geometry is periodic and comprises a sinusoidal form that varies in peak position along the span of the contour surface.

46. The apparatus of claim 1, wherein the contour surface geometry comprises a form which is periodic that is constant in peak position along the span of the contour surface, combined with a sinusoidal form that varies in peak position along the span of the contour surface.

47. The apparatus of claim 6, wherein the riblets have variations in their contour structure geometry.

48. The apparatus of claim 6, wherein the riblets comprise compound riblets, and three-dimensional riblets.

49. The apparatus of claim 6, further comprising: at least one of a positive pressure source configured to blow air and a negative pressure source configured to create suction along the surface of the riblets, wherein the riblets are compound riblets locally optimized to flow direction.

50. The apparatus of claim 1, further comprising at least one of:
- an ionized gas blower configured for injection of ionized gas into a boundary layer,
- a negative pressure source configured to create suction at the trailing edge, and
- a field generator configured to generate a longitudinal electric field within the boundary layer for electro-aerodynamic boundary layer profile control.

51. The apparatus of claim 1, wherein the solid-body surface at the leading or trailing edge comprises geometric variations on at least one of a macroscopic scale, microscopic scale, and nanoscopic scale.

* * * * *

UNITED STATES PATENT AND TRADEMARK OFFICE
CERTIFICATE OF CORRECTION

Page 1 of 1

PATENT NO. : 10,611,468 B2
APPLICATION NO. : 11/852753
DATED : April 7, 2020
INVENTOR(S) : Sullivan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2502 days.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*